UNITED STATES PATENT OFFICE.

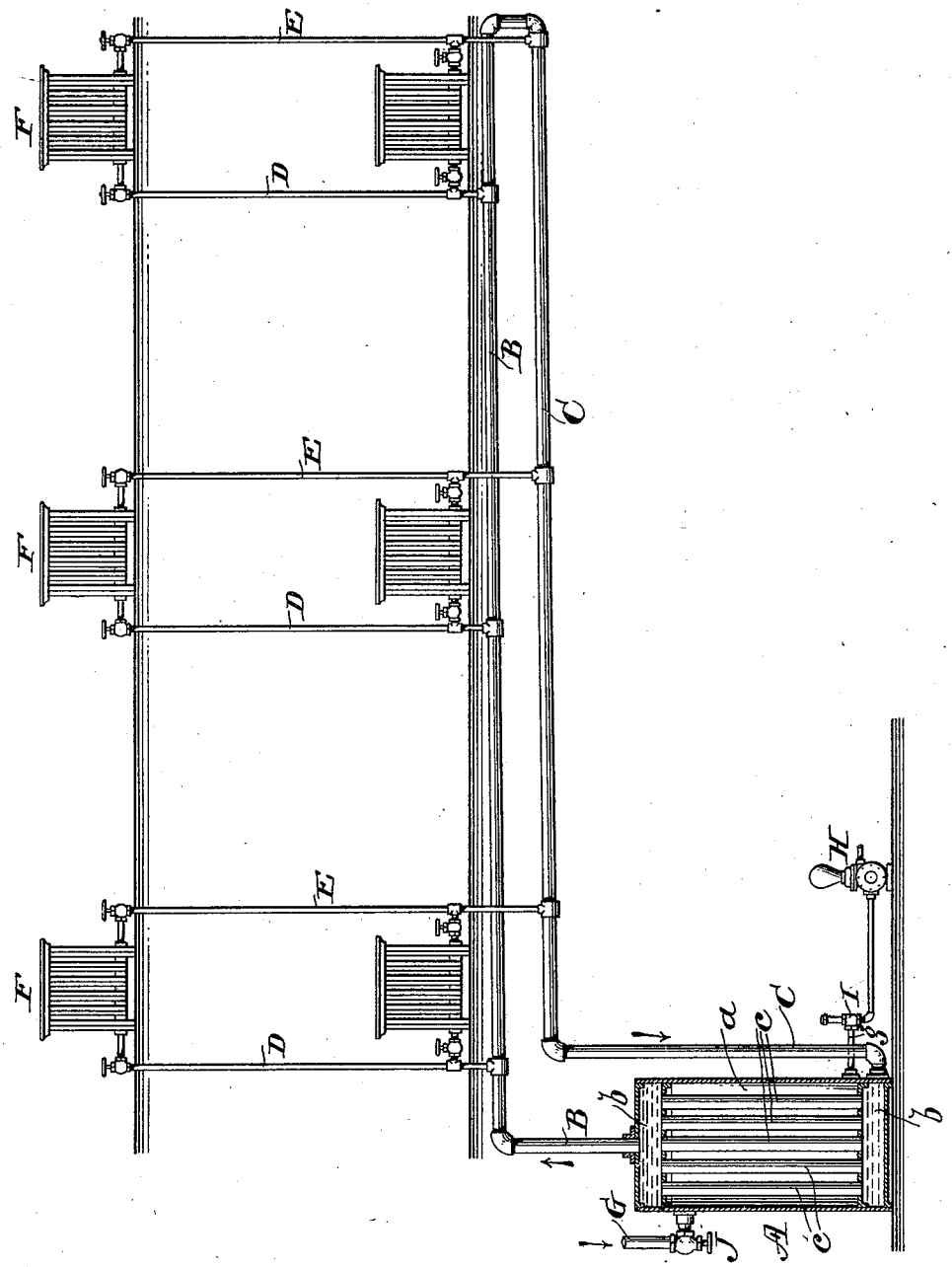

MEREDITH LEITCH, OF BOSTON, MASSACHUSETTS, ASSIGNOR TO THE WARREN WEBSTER & COMPANY, OF NEW JERSEY.

HOT-WATER HEATING SYSTEM.

SPECIFICATION forming part of Letters Patent No. 635,787, dated October 31, 1899.

Application filed February 25, 1899. Serial No. 706,826. (No model.)

*To all whom it may concern:*

Be it known that I, MEREDITH LEITCH, of Boston, Suffolk county, Massachusetts, have invented an Improvement in Hot-Water Heating Systems, of which the following is a specification.

My invention relates to systems of hot-water heating; and it consists of the improvements which are fully set forth in the following specification and are shown in the accompanying drawing.

In hot-water heating systems in which hot water is circulated through a system of pipes much difficulty has been experienced in regulating or modulating the temperature. As the radiation from the coils or radiators depends upon the temperature of the water passing through them, satisfactory regulation of temperature can be obtained only by the regulation of the temperature of the water. This heretofore has been difficult of accomplishment and the only practical method of regulation in such systems has been the temporary shutting off of a radiator or coil.

It is the object of my invention to enable the temperature of the hot water which circulates through the system to be easily regulated within reasonable limits, and thereby to regulate the effective radiation of the coils or radiators. This object I accomplish by the employment of means for controlling the amount of heat imparted to the water in the heater; and in carrying out my invention I employ a heater in which the water is heated by the condensation of steam circulated through a steam chamber, jacket, or coil from which the air and water of condensation are discharged or drawn out by a lower pressure maintained in the outlet by an exhausting apparatus, with a thermostatic valve interposed in the outlet to prevent the escape of steam. By means of a valve in the steam-supply inlet to the heater I am able to control or regulate the quantity of steam admitted, and as the heat-units of the steam depend upon its quantity I am thus enabled to control the heat-units imparted to the water and the temperature resulting therefrom. This result is possible because of the lower pressure maintained in the heater by the exhausting apparatus, which draws off the air and water of condensation which would otherwise have to be expelled by the pressure of the incoming steam, in consequence of which it would be necessary to maintain the steam-chamber at all times full of steam under pressure, and no modulation of temperature below that resulting from the condensation of that quantity of steam at that pressure and temperature would be possible.

The accompanying drawing shows a side elevation of a hot-water heating system embodying my invention, with the water-heater in vertical section.

A is a hot-water heater in which a body of water is heated by the condensation of steam circulated through it in a jacket or coil. This heater may be of any suitable character; but for purposes of illustration I have shown a heater of well-known construction consisting of a central steam-chamber $a$, with water-heads $b\ b$ at the ends connected by a series of water-tubes $c$.

B is the supply-pipe for hot water, leading from the heater A, and C is the return leading thereto.

D are the supply-risers, leading from the supply-pipe B to the radiators or heaters F, and E are the return-bleeders, leading from the outlets of the heaters or radiators to the return-main C.

G is the steam-supply pipe, by which steam is supplied to the steam chamber or coil of the heater, and $g$ is the outlet for the discharge of water of condensation from said coil or chamber. Connected with said outlet $g$ is a vacuum-pump H or other suitable exhausting device for maintaining a lower pressure in the outlet and drawing out the air and water of condensation from the steam coil or chest of the heater A.

I is a thermostatic valve, which may be of any suitable construction, located in the outlet $g$ between the pump or exhauster and heater and adapted to open to permit the escape of air and water of condensation, but to close to the passage of steam.

The operation of the pump or exhausting apparatus H acts to draw the air and water of condensation from the steam chest or coil of the heater and to maintain it filled with steam.

J is a valve in the steam-supply pipe for controlling the quantity of steam admitted to the heater.

The water heated by the condensation of the steam in the heater A ascends in the supply-pipe B and passes through the risers D to the radiators F, returning through the bleed-pipes E and return-main C back to the heater. As the temperature of this water depends upon the number of heat-units absorbed from the steam condensed in the heater A, it is obvious that if the quantity of steam admitted to the heater can be regulated the resulting number of heat-units and temperature of the water can be controlled. By maintaining a lower pressure in the heater through the agency of the exhausting apparatus H, and thus keeping it free from air and water of condensation, while preventing the escape of steam through the thermostatic valve I, I am enabled by the regulation of the supply-valve J to increase or decrease the quantity of steam admitted. The smaller volumes of steam entering the heater are expanded or drawn out by the lower pressure therein; but as the resulting temperature imparted to the water depends solely upon the number of heat-units contained in the quantity of steam admitted and condensed it is obvious that the regulation of the supply-valve J will control the temperature of the hot water in the heater.

Having now described my invention, what I claim as new, and desire to secure by Letters Patent, is as follows:

1. In a hot-water heating system, the combination of a hot-water heater containing a steam-chamber, a steam-supply pipe leading to said steam-chamber, hot-water-circulating pipes leading from and returning to said heater, an exhausting apparatus connected with the outlet of the steam-chamber of said heater, a thermostatic valve located in said outlet, and a controlling-valve located in the steam-supply pipe to said heater.

2. In a hot-water heating system, the combination of a hot-water heater containing a steam-chamber, hot-water-circulating pipes leading from and returning to said heater, radiators, heaters or coils communicating with said hot-water-circulating pipes, a steam-supply pipe leading to the steam-chamber of said heater, an exhausting apparatus connected with the outlet of said steam-chamber, and a thermostatic valve located in said outlet.

3. The combination of a hot-water-circulating system embracing a hot-water heater containing a steam-chamber, of a supply-pipe for supplying steam thereto, an outlet for the discharge of air and water of condensation, exhausting devices connected with said outlet, and a thermostatic valve located between said outlet and exhausting devices.

4. In a hot-water heating apparatus embracing a system of circulating-pipes and a water-heater containing a steam chest or chamber, the combination with said heater, of means for controlling the quantity of steam admitted to the steam chest or chamber thereof, and thereby regulating the temperature of the water resulting from the condensation of the quantity of steam admitted.

In testimony of which invention I have hereunto set my hand.

MEREDITH LEITCH.

Witnesses:
J. FRANK TUTTLE,
WM. H. WOODMAN.